(12) United States Patent
Vyas

(10) Patent No.: US 11,566,910 B2
(45) Date of Patent: Jan. 31, 2023

(54) CUSTOMER NAVIGATION SYSTEM

(71) Applicant: PAYPAL, INC., San Jose, CA (US)

(72) Inventor: Adhish N. Vyas, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 444 days.

(21) Appl. No.: 16/236,841

(22) Filed: Dec. 31, 2018

(65) Prior Publication Data

US 2020/0209003 A1    Jul. 2, 2020

(51) Int. Cl.
- *G01C 21/36* (2006.01)
- *G01C 21/34* (2006.01)
- *G06F 16/909* (2019.01)
- *G06Q 30/02* (2012.01)

(52) U.S. Cl.
CPC ....... *G01C 21/3461* (2013.01); *G06F 16/909* (2019.01); *G06Q 30/0226* (2013.01); *G01C 21/3676* (2013.01); *G01C 21/3697* (2013.01)

(58) Field of Classification Search
None
See application file for complete search history.

(56) References Cited

U.S. PATENT DOCUMENTS

| | | | | |
|---|---|---|---|---|
| 2009/0119142 | A1* | 5/2009 | Yenni | H04L 67/12 705/7.15 |
| 2015/0032277 | A1* | 1/2015 | Warren | G05B 15/02 700/291 |
| 2015/0317681 | A1* | 11/2015 | Zamer | G06Q 30/0273 705/14.58 |
| 2016/0363450 | A1* | 12/2016 | Sahay | G06Q 10/06 |
| 2017/0006429 | A1* | 1/2017 | Douglas | H04W 40/20 |

* cited by examiner

*Primary Examiner* — Peter D Nolan
*Assistant Examiner* — Roy Rhee
(74) *Attorney, Agent, or Firm* — Haynes and Boone, LLP

(57) ABSTRACT

Systems and methods for providing customer navigation include a system provider device that may receive a query for directions to a first merchant physical location. Responsive to receiving the query, the system provider device determines a first travel time to the first merchant physical location and a second travel time to a second merchant physical location. The system provider device further determines a first wait time at the first merchant physical location and a second wait time at the second merchant physical location. Additionally, the system provider device determines that a first total time using the first travel time and the first wait time is shorter than a second total time using the second travel time and the second wait time. Based on determining that the first total time is shorter than the second total time, the system provider device may provide navigation to the first merchant physical location.

20 Claims, 12 Drawing Sheets

CUSTOMER NAVIGATION SYSTEM

BACKGROUND

Field of the Invention

The present disclosure generally relates to electronic navigation, and more particularly to a customer navigation system that provides directions based on a merchant activity level.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with merchant physical locations and their customers in order to allow the customers to make purchases from the merchants at the merchant physical locations. When deciding upon a particular merchant physical location to visit, and in particular while traveling, customers may make their decision based largely on a physical distance and/or travel time (e.g., drive time) required to reach a particular merchant physical location. By way of example, a customer may use the navigation system on their mobile device or in-vehicle infotainment (IVI) system (to which the customer's mobile device may be connected) to search for a particular merchant physical location (e.g., by merchant type or merchant name). This type of search may often return suboptimal results by directing the customer to the closest merchant physical location (e.g., based on a shortest distance and/or travel time as determined using the navigation system) without considering additional factors that may cause unnecessary increases in total travel time.

Thus, there is a need for a customer navigation system that provides directions based on a merchant activity level and thereby improves the customer experience.

Figure 1:
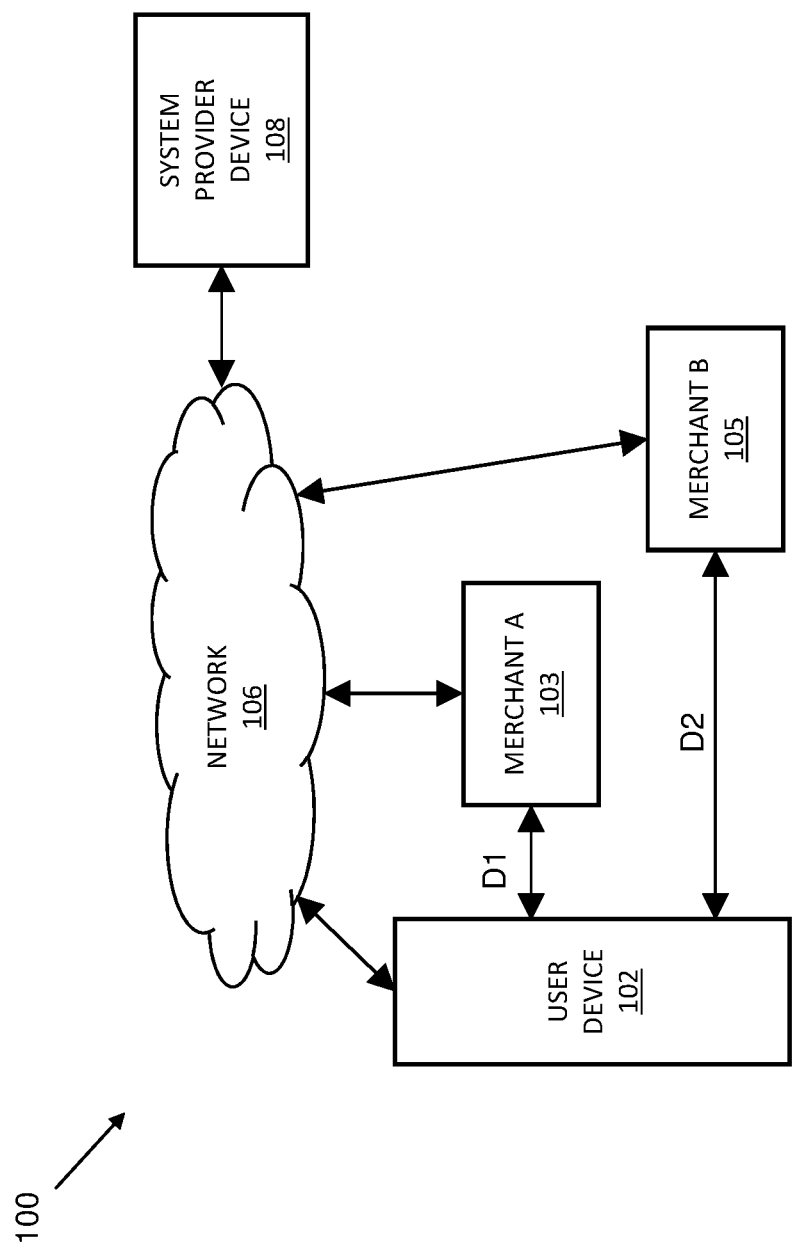
FIG. 1 is a schematic view illustrating an embodiment of a customer navigation system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a customer a customer navigation system that provides directions based on a merchant activity level. By way of example, the systems and methods described herein provide for more efficient routing of customers to merchant physical locations based on a total time spent traveling to (e.g., driving to), and waiting at, a merchant physical location. For clarity of discussion, the total time spent traveling to, and waiting at a merchant physical location may simply be referred to as a "total time spent" or a "total customer time". Thus, at least some embodiments of the present disclosure aim to minimize the total customer time.

In addition, it is noted that the various examples and embodiments illustrated and discussed herein are specifically rooted in computer technology. For instance, and in accordance with various embodiments, customers may navigate to a merchant physical location using a customer device including a GPS receiver, where the customer device communicates with one or more merchant devices and a system provider device over one or more computer networks. Further, the various embodiments shown and described herein provide a solution (e.g., optimized navigation based on estimated customer travel times and wait times) to a problem specifically arising in the realm of computer networks (e.g., poor GPS navigation based simply on distance).

In at least some current implementations, as previously noted, a customer using the navigation system on their mobile device or IVI system to search for a particular merchant physical location may generally be directed to the closest merchant physical location (e.g., based on a shortest distance and/or travel time as determined using the navigation system). However, directing a customer to a merchant physical location simply based on distance and/or travel time does not consider how long a service experience at the merchant physical location will last (e.g., including wait time to place an order, wait time to receive the order, and/or times associated with a variety of other service experience factors). Thus, in some cases, a total time spent traveling to (e.g., driving to), and waiting at, the closest merchant physical location may be greater than a total time spent traveling to, and waiting at, another merchant physical location located farther away than the closest merchant physical location. This not only wastes a customer's time but can also lead to increased customer frustration and dissatisfaction. Thus, there is a need for a customer navigation system that provides directions based on a merchant activity level and thereby improves the customer experience.

Generally, the customer navigation system described herein may direct the customer (e.g., using the navigation system) to a merchant physical location based on a combination of (i) distance and/or travel time to the merchant physical location and (ii) customer wait time at the merchant physical location. In some cases, the customer wait time may include various service experience factors such as wait time to place an order, wait time to receive the order, and/or times associated with a variety of other service experience factors that may contribute to the total customer time. In some embodiments, the customer wait time is based in part on a merchant activity level. By way of example, the merchant activity level may include a variety of factors such as payment volume (e.g., total and/or per unit time), rate of transactions (e.g., number of transactions per minute), as well as a usage or consumption rate of any of a plurality of consumable goods or utilities (e.g., electricity, gas, water, sewage, internet, or other utilities). Consumable goods may include any of a variety of types of goods that are intended for consumption (e.g., by a person, machine, or otherwise consumed) and may vary, for example, based on merchant type. For instance, and as merely one example, consumables at a coffee shop may include coffee beans, cups, lids, packaged foods and drinks, pastries, tea bags, syrups, milk, sugar, napkins, toilet paper, hand soap, or any other of a variety of consumables. In some cases, the customer wait time may also be based on other factors such as a staffing level at a merchant physical location, a number of cars parked at or near the merchant physical location, a number of people at the merchant physical location, traffic patterns near the merchant physical location, or various other factors.

In some cases, embodiments of the customer navigation system described herein may also provide a mechanism by which a merchant operating a plurality of merchant physical locations, or a plurality of merchants operating a plurality of merchant physical locations, can maintain a steadier stream of customers. For example, by directing a customer (e.g., using the navigation system) away from a busier merchant physical location (e.g., having long wait times) and to an alternative merchant physical location (e.g., having comparably shorter wait times), even if the alternative merchant physical location is farther away, the total customer time (travel time+wait time) may be improved (reduced). In some examples, a customer may be directed to an alternative merchant physical location operated by the same merchant that operates the busier merchant physical location, or to an alternative merchant physical location operated by a different merchant than the merchant that operates the busier merchant physical location. In some embodiments, directing the customer to an alternative merchant physical location operated by a different merchant may be based on a customer sharing agreement between the merchant operating the busier merchant physical location and the merchant operating the alternative merchant physical location. In some cases, a referral fee may be paid to the merchant operating the busier merchant physical location. In various cases, any of a plurality of merchants operating the plurality of merchant physical locations may operate in a cooperative or competitive manner, may offer competing products and/or services, or may offer complementary products and/or services. In some cases, merchants may also bid against one another for the navigation system to direct a customer to their merchant physical location. Further, in some embodiments, the navigation system may provide directions to one or more alternate merchant physical locations as options, allowing the customer to make a final selection (e.g., via the navigation system).

One of skill in the art in possession of the present disclosure will recognize that a wide variety of merchants, providing many different types of goods and/or services, will benefit from the systems and methods discussed below, and thus will fall within the scope of the present disclosure. In addition, the systems and methods disclosed herein may be implemented in numerous ways for different merchants, and any of a plurality of factors that have a direct impact, an indirect impact, or otherwise influence travel time (to the merchant physical location) and wait time (at the merchant physical location) may be used to direct the customer to a particular merchant physical location and thus fall within the scope of the present disclosure. Also, the embodiments and various examples described herein are merely illustrative and are not meant to be limiting in any way beyond what is written in the claims that follow.

Referring now to FIG. 1, an embodiment of a customer navigation system 100 is illustrated. The customer navigation system 100 includes a user device 102 operated by a user. In various embodiments, the user device 102 may include any type of computing device such as a laptop, a desktop, a mobile device, or other appropriate computing device operated by any type of user (e.g., individual, customer, merchant, or other type of user). In some cases, the user device 102 may include an in-vehicle infotainment (IVI) system (to which the user's mobile device may be connected). While the embodiments herein are generally shown and described with reference to a single user device (e.g., user device 102) operated by a single user for the sake of clarity, it will be understood that various embodiments may include a plurality of user devices operated by a plurality of users at a plurality of user physical locations. In various examples, the user device 102 is coupled to a network 106 that is further coupled to a system provider device 108. For example, the user device 102 and the system provider device 108 are configured to communicate with one another by way of the network 106, for example by way of network communication devices, as discussed below.

In some embodiments, the customer navigation system 100 further includes a first merchant 103 (illustrated and equivalently referred to as "Merchant A") having a first merchant physical location and a second merchant 105 (illustrated and equivalently referred to as "Merchant B") having a second merchant physical location different than the first merchant physical location. In some cases, the first merchant 103 may be physically located a distance 'D1' from a user physical location (e.g., a user operating the user device 102), and the second merchant 105 may be physically located a distance 'D2' from the user physical location. In some embodiments, the distance 'D2' is greater than the distance 'D1', thus a user's travel time to the second merchant 105 may be greater than the user's travel time to the first merchant 103. Alternatively, in some examples, the distance 'D1' may be greater than the distance 'D2'. Further, each of the first merchant 103 and the second merchant 105 may include one or more merchant devices that are coupled to the network 106 that is further coupled to the system provider device 108. For example, the first merchant 103, the second merchant 105, and the system provider device 108 are configured to communicate with one another by way of the network 106, for example by way of network communication devices, as discussed below. One of skill in the art in possession of the present disclosure will recognize that the customer navigation system 100 described herein may be utilized with virtually any merchant type located at virtually any merchant physical location. As such, and in various embodiments, each of the first merchant 103 and/or the second merchant 105 may provide any of a plurality of merchant types such as, for example, a coffee shop, a restaurant, a department store, a grocery store, a convenience store, a drug store, a movie theater, and/or a variety of other merchant physical locations known in the art. Moreover, in some embodiments, the first and second merchant physical locations may include conventional brick-and-mortar physical locations, as well as mobile merchant locations (e.g., food trucks, carts, kiosks, trailers, or other mobile merchant locations).

The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the user device 102, the first merchant 103, and/or the second merchant 105 may communicate through the network 106 via cellular communication, by way of one or more user network communication devices or merchant network communication devices. In other examples, the user device 102, the first merchant 103, and/or the second merchant 105 may communicate through the network 106 via wireless communication (e.g., via a WiFi network), by way of one or more user network communication devices or merchant network communication devices. In yet other examples, the user device 102, the first merchant 103, and/or the second merchant 105 may communicate through the network 106 via any of a plurality of other radio and/or telecommunications protocols, by way of one or more user network communication devices or merchant network communication devices. In still other embodiments, the user device 102, the first merchant 103, and/or the second merchant 105 may communicate through the network 106 using a Short Message Service (SMS)-based text message, by way of one or more user network communication devices or merchant network communication devices.

The system provider device 108 may likewise couple to the network 106 via a wired or wireless connection. As described in more detail below with reference to FIG. 12, the system provider device 108 may include a customer navigation engine, a communication engine, a merchant information database, and a customer database. Software or instructions stored on a computer-readable medium and executed by one or more processors of the system provider device 108, allows the system provider device 108 to send and receive information over the network 106. Furthermore, the customer navigation engine in the system provider device 108 may be configured to implement the various embodiments of the customer navigation system as described herein.

In accordance with embodiments discussed herein, the system provider device 108 is configured to provide more efficient routing of customers to merchant physical locations based on a total time spent traveling to (e.g., driving to), and waiting at, a merchant physical location. For instance, the system provider device 108 may process a user search for a particular merchant physical location (e.g., by merchant type or merchant name) and return results and/or direct the user to a merchant physical location based on a combination of (i) distance and/or travel time to the merchant physical location and (ii) customer wait time at the merchant physical location. Thus, in various embodiments, the system provider device 108 may retrieve and/or compute physical locations of a user (e.g., the user device 102) and a plurality of merchant physical locations (e.g., using a GPS system), including traffic conditions and travel times from the user to each of the plurality of merchant physical locations. The system provider device 108 may further monitor merchant activity levels, usage or consumption rate of any of a plurality of consumable goods or utilities, merchant staffing levels, as well as any of a plurality of other factors that may be used to determine a customer wait time at each of the plurality of merchant physical locations.

In some examples, based on the travel times and customer wait times, the system provider device 108 may thus direct the user to a particular merchant physical location that provides the shortest total customer time (e.g., the total time spent traveling to, and waiting at, a merchant physical location). In some examples, the system provider device 108 may automatically direct the user or may provide options for user selection. In some embodiments, the user may configure one or more preferences such that the system provider device 108 may automatically determine to which merchant physical location the user should be directed. In some examples, the system provider device 108 may learn (e.g., based on user behaviors) and intelligently select the merchant physical location to which the user should be directed. While some examples of functions performed by the system provider device 108 have been provided, those skilled in the art in possession of the present disclosure will recognize other functionality that may further be performed by the system provider device 108, while remaining within the scope of the present disclosure.

In addition, in some embodiments, the system provider (e.g., operating the system provider device 108) may include a payment service provider such as, for example, PayPal™ Inc. of San Jose, Calif., that provides the customer navigation system 100 for a user operating the user device 102, as well as any other users implementing the customer navigation system 100. Information sent and received through the network 106, the user device 102, and the merchant devices may be associated with user or merchant accounts in a database located in a non-transitory memory, and any use of that information may be stored in association with such user or merchant accounts. Furthermore, the payment service provider may provide the customer navigation system 100 for a plurality of different users, similarly as described for a user operating the user device 102, discussed below. Thus, references to a system provider operating a system provider device below may refer to a payment service provider operating a payment service provider device or may refer to any other entity providing a customer navigation system separate from or in cooperation with a payment service provider.

Figure 2:
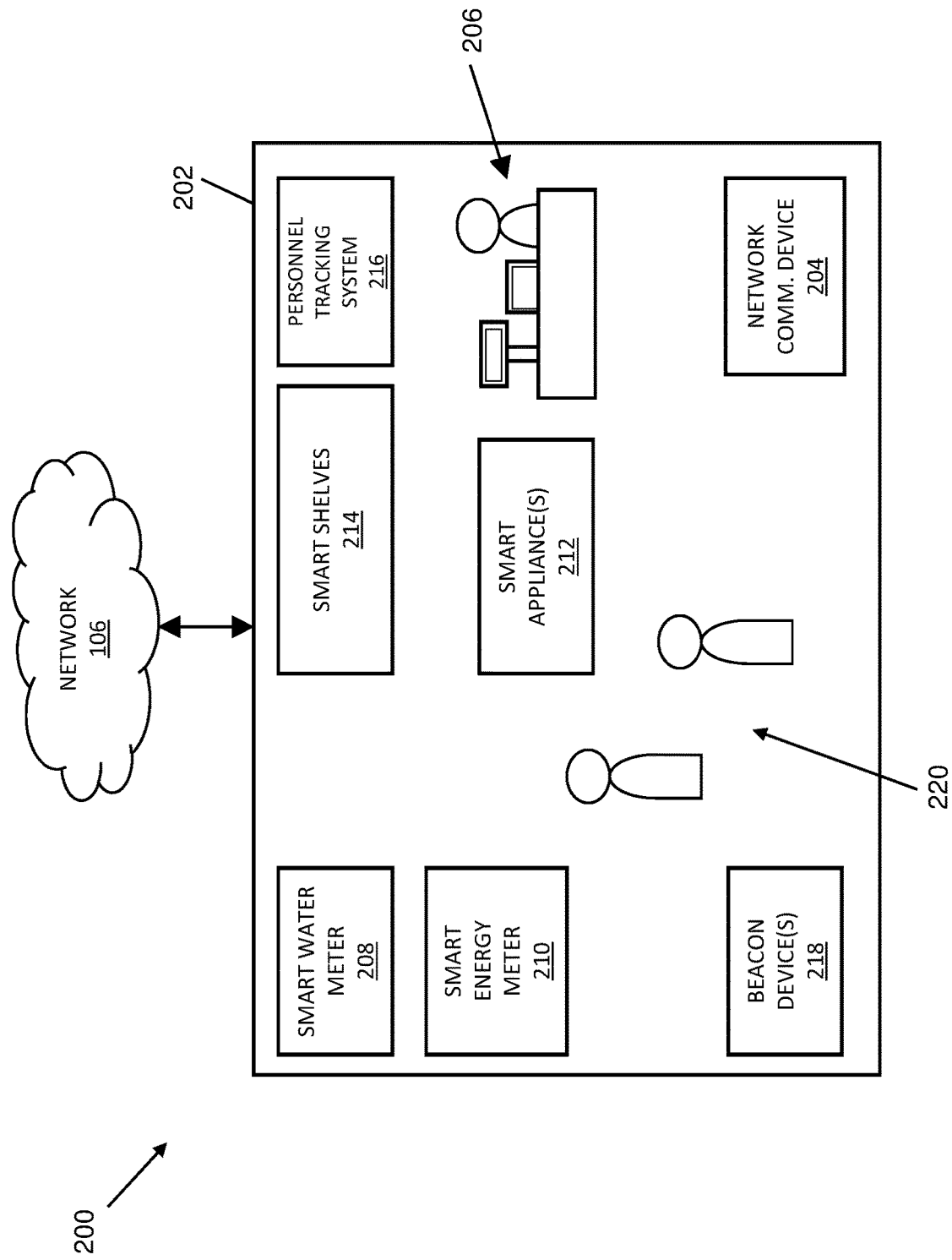
FIG. 2 is a schematic view illustrating a portion of the customer navigation system including an exemplary merchant physical location.

Referring now to FIG. 2, a portion 200 of the customer navigation system 100 is illustrated. The illustrated portion 200 includes a merchant 202 in communication with the network 106. In some examples, the merchant 202 may communicate with the network 106 using a merchant network communication device 204. In some embodiments, the merchant 202 may include the first merchant 103 and the second merchant 105, described above. In particular, the merchant 202 may include a plurality of elements for monitoring merchant activity levels, usage or consumption rate of consumable goods or utilities, merchant staffing levels, as well as other elements that can be used for monitoring other factors for determining a customer wait time at the physical location of the merchant 202. For purposes of the discussion that follows, it will be assumed that the merchant 202 includes a coffee shop. However, the embodiments described herein are not limited to any particular type of merchant, and in some embodiments the merchant 202 may include any of a plurality of merchant types, as described above.

In some examples, the merchant 202 includes a point of sale 206 (e.g., a cash register). In various examples, the point of sale 206 may include an electronic or manual cash register, a barcode scanner or barcode reader, a scale, and/or other point of sale features known in the art. In some embodiments, the point of sale 206 includes a customer self-service register. At the point of sale 206, the merchant 202 calculates an amount owed by the customer (e.g., for goods and/or services rendered), displays the amount owed (e.g., using a display attached to the point of sale 206), and provides options for the customer to make a payment for the amount owed. The customer may thus also effectuate the payment via the point of sale 206, and after receiving payment, the merchant 202 may issue a receipt for the transaction (e.g., which may be printed out or delivered electronically). In some cases, the customer makes the payment using a payment terminal, a touch screen, a mobile and/or wireless point of sale device, or other suitable device.

Regardless of the particular implementation, the point of sale 206 may be used to monitor sales activity data for the merchant 202, for example, including payment volume (e.g., total payment volume and/or payment volume per unit time) and/or rate of transactions (e.g., number of transactions per minute), among others. In some embodiments, the sales activity data may be sent to the system provider device 108 (e.g., by way of the network 106), where the system provider device 108 uses the sales activity data as part of the system and method to provide optimized navigation results to the user (e.g., by minimizing the total customer time). As such, in various cases, the sales activity data may be used to estimate a customer wait time. For instance, if the sales activity data indicates an increased total payment volume, an increased payment volume per unit time, and/or an increased rate of transactions, this may indicate that the merchant 202 is busy and customer wait times have increased. Other factors may include the number of transactions/payments being processed by each device at the merchant location. For example, if only one device at one merchant location is being used to process 100 transactions per hour, but five devices at another merchant location are being used to process 200 transactions per hour (or four transactions each per hour), the customer may be directed to the latter merchant location even though that merchant is processing a larger number of transactions. In some cases, a baseline level of sales activity may be defined, where customer wait time may be correlated to deviations in sales activity from the defined baseline level.

Figure 3:
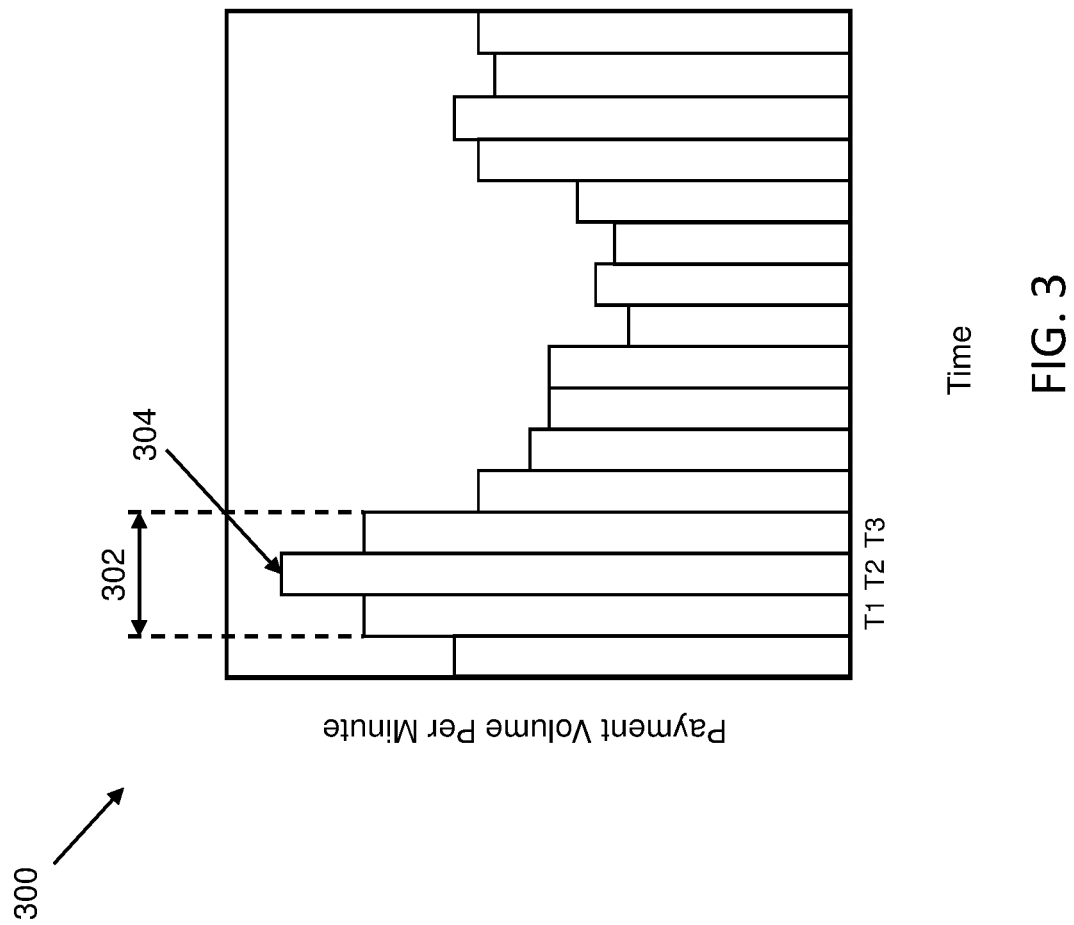
FIG. 3 illustrates an exemplary chart showing a payment volume as a function of time.

With reference to FIG. 3, illustrated therein is an exemplary chart 300 showing a payment volume as a function of time. In particular, the chart 300 provides a histogram showing a distribution of a 'Payment Volume Per Minute' versus 'Time'. While presented as a histogram, it is understood that the data shown in the chart 300 may equally be represented using another type of chart such as a line chart, a scatter chart, or other type of suitable chart. As shown, and by way of example, the chart 300 indicates a period 302 of particularly high payment volume, and thus increased customer wait times, from time 'T1' to time 'T3', with a peak payment volume 304 occurring at a time 'T2'. For the present example, the chart 300 may represent payment volume data for a particular coffee shop. Thus, by way of example and based in part on the data of the chart 300, if a customer searches for the particular coffee shop (e.g., using the navigation system and during the time period 302), the system provider device 108 may use the payment volume data to direct the customer to an alternative coffee shop (e.g., to reduce and/or minimize the total customer time). To be sure, if the customer searches for the particular coffee shop during a different time period (e.g., outside the time period 302), the system provider device 108 may nevertheless direct the customer to an alternative coffee shop if, for example, directing the customer to the alternative coffee shop provides a better (e.g., shorter) total customer time (travel time+wait time). Further, in some examples, if a customer searches for the particular coffee shop (e.g., during the time period 302), the system provider device 108 may still direct the customer to the particular coffee shop if, for example, directing the customer to the particular coffee shop provides a shorter total customer time than directing the customer to an alternative coffee shop.

In some embodiments, the merchant 202 may further include any of a plurality of smart devices, for example, to monitor a usage or consumption rate of any of a plurality of consumable goods or utilities (e.g., electricity, gas, water, sewage, internet, or other utilities). In some cases, "smart devices" include devices connected to other devices or networks via different wireless protocols such as Bluetooth, near field communication (NFC), Wi-Fi, 3G, or other appropriate protocols, that can operate to some extent interactively and autonomously. In some examples, smart devices may also include smart sensors for sensing various inputs within a surrounding environment and in some cases performing one or more specified actions. While some examples of smart devices have been provided, those skilled in the art in possession of the present disclosure will recognize other smart devices that may be used, while remaining within the scope of the present disclosure.

As one example, the merchant 202 may include a smart water meter 208. In some embodiments, the smart water meter 208 may include a water meter connected to a data logger that provides for continuous monitoring of water consumption at the merchant 202 physical location. In particular, the smart water meter 208 may be configured to provide real-time water consumption data. For purposes of this disclosure, "real-time" may be defined as occurring within a few seconds. As part of the continuous monitoring of water consumption, the smart water meter 208 may be configured to detect any of a plurality of "water events", where a "water event" may be defined as any type of event where water is consumed. Some examples of water events (e.g., in a coffee shop or restaurant) may include dishwashing, equipment cleaning, cleaning of the merchant physical location (e.g., washing windows, mopping, etc.), cooking, general sink usage, brewing coffee, toilet flushing, or other types of water consumption events. In some embodiments, the smart water meter 208 may be configured to discriminate (identify) particular types of water events from water event-specific patterns appearing in the logged data (e.g., based on various parameters such as flow rate, volume and time). In some cases, the smart water meter 208 may detect and log the water events, where such water consumption data is provided to the system provider device 108 to estimate a customer wait time and thus provide optimized navigation results to the user (e.g., by minimizing the total customer time). For instance, if the water consumption data indicates increased water consumption, this may indicate that the merchant 202 is busy and customer wait times have increased. As merely one example, the smart water meter 208 may detect an increased amount of water consumption due to increased toilet flushing, increased coffee consumption, or an increased caused by any other water event, indicating an increased number of customers at the merchant 202 physical location. In some cases, a baseline level of water consumption may also be defined, where customer wait time may be correlated to deviations in water consumption from the defined baseline level.

In another example, the merchant 202 may include a smart energy meter 210. In some embodiments, the smart energy meter 210 may provide for continuous monitoring of energy consumption (e.g., including electricity and/or natural gas consumption) at the merchant 202 physical location. The smart energy meter 210 may also be configured to provide the energy consumption data is real-time. In various examples, the smart energy meter 210 may be configured to detect any of a plurality of "energy events", where an "energy event" may be defined as any type of event where energy (e.g., electricity and/or natural gas) is consumed. Some examples of energy events (e.g., in a coffee shop or restaurant) may include heating and cooling of the merchant 202 physical location, operating lamps and lighting fixtures, cooling and lighting display cases, heating water (e.g., using a water heater to generate heated water for sink use, dishwashing, cleaning, cooking, brewing coffee, etc.), operating appliances (e.g., dishwashers, ovens, broilers, refrigerators, coffee makers, espresso machines, patio heaters, ice machines, bathroom hand dryers), or other types of energy events as known in the art. In some examples, the smart energy meter 210 may detect and log the energy events, where such energy consumption data is provided to the system provider device 108 to estimate a customer wait time and thus provide optimized navigation results to the user (e.g., by minimizing the total customer time). For example, if the energy consumption data indicates increased energy consumption, this may indicate that the merchant 202 is busy and customer wait times have increased. As merely one example, the smart energy meter 210 may detect an increased amount of energy consumption due to more frequent opening and closing of doors (e.g., due to increased customer traffic), which may cause increased use of a heating, ventilation, and air conditioning (HVAC) system to maintain a desired temperature within the merchant 202 physical location. In other examples, energy consumption may increase due to increased use of bathroom hand dryers, coffee machines, espresso machines, or an increase caused by any other energy event, indicating an increased number of customers at the merchant 202 physical location. In some cases, a baseline level of energy consumption may also be defined, where customer wait time may be correlated to deviations in energy consumption from the defined baseline level.

The merchant 202 may further include one or more smart appliances 212. Considering the example of the merchant 202 including a coffee shop, the one or more smart appliances 212 may include a smart coffee maker, a smart coffee grinder, a smart espresso machine, or a combination thereof, among others, that provide data that may be used to estimate customer wait times. For examples, in some embodiments, a smart espresso machine may be configured to provide data such as a number of drinks that have been prepared, a quantity/weight/volume of water and/or milk processed and/or of coffee beans that have been consumed (e.g., ground), a number of times different buttons controlling various functions of the espresso machine have been depressed (e.g., by a user), an amount of electricity used, or other appropriate data. In some cases, the one or more smart appliances 212 may be used in conjunction with the smart water meter 208 and/or the smart energy meter 210 to monitor water and/or energy consumption. Alternatively, in some embodiments, the smart appliances 212 may be configured to independently monitor water and/or energy consumption. In some embodiments, the smart appliances 212 may be configured to provide the monitored data in real-time. In various examples, data collected by the one or more smart appliances 212 may be provided to the system provider device 108 to estimate a customer wait time at the merchant 202 physical location. For instance, if the data monitored by the smart appliances 212 indicates increased resource consumption (e.g., increased consumption of coffee beans, milk, water, etc.), this may indicate that the merchant 202 is busy and customer wait times have increased. In some cases, a baseline level of water, energy, and/or resource consumption for the smart appliances 212 may be defined, where customer wait time may be correlated to deviations in consumption from the defined baseline level.

In some embodiments, the merchant 202 may also include smart shelves 214, which may be employed as a type of inventory management system. In various examples, the smart shelves 214 may be used in a stockroom, a display case, a refrigerator, or in any of a variety of shelving units disposed throughout the merchant 202 physical location. In general, the smart shelves 214 may be configured to provide real-time inventory information that may be used, by the system provider device 108, to estimate customer wait times, as described in more detail below. In some cases, the smart shelves 214 may include weight sensors that detect (by weight) quantities of items on the shelves and provide such data to the system provider device 108 for estimation of customer wait times. In addition to, or instead of, the weight sensors, the smart shelves 214 may include radio frequency identification (RFID) antennas (e.g., connected to an RFID reader), where each item placed on the smart shelves 214 includes an RFID tag. In various embodiments, an RFID tag's electronic product code (EPC) may be associated with an item's serial number or identification number on which the RFID tag is attached. In some embodiments, the RFID reader and antennas may be configured to either continuously read what items are on the smart shelves 214 (via the RFID tags), or the RFID reader and antenna may be configured to perform such a reading at pre-defined time intervals or upon detection of a particular event (e.g., when an attached door is open or closed, when the weight sensors detect a change in weight, or other type of event). In some cases, the smart shelves 214 may further include optical sensors, cameras, or other appropriate sensors or devices. In various examples, the weight sensor data, optical sensor data, camera data, and/or data read by the RFID reader and antenna may be sent to system provider device 108 (e.g., for estimation of customer wait times). For example, if the data monitored by the smart shelves 214 indicates an increase in inventory consumption, and hence an increased resource consumption (e.g., increased sales of retail items and/or increased usage of stockroom items), this may indicate that the merchant 202 is busy and customer wait times have increased. In some cases, a baseline level of inventory consumption for the smart shelves 214 may be defined, where customer wait time may be correlated to deviations in inventory consumption from the defined baseline level.

In some cases, the merchant 202 may include a personnel tracking system 216. By way of example, the personnel tracking system 216 may be used to track employee time and attendance, and thus provide a real-time staffing level for the merchant 202. In some embodiments, the staffing level provided by the personnel tracking system 216 may also be used by the system provider device 108 for estimation of customer wait times. For instance, if the merchant 202 physical location is short-staffed (e.g., having too few or a fewer than usual number of employees), then customer wait times may be expected to increase. The personnel tracking system 216 may be implemented in any of a variety of ways such as using a biometric time clock (e.g., using fingerprints), a proximity time clock (e.g., using swipe cards, ID badges, key fobs, or PIN/keypad entry), a web-based (Internet-based) time clock, or other type of time clock.

In some embodiments, the merchant 202 further includes one or more beacon devices 218. In various embodiments, the beacon devices 218 may be configured to detect customers 220 in and around the merchant 202 physical location. By way of example, the beacon devices 218 may include a Wi-Fi communications system and a Bluetooth® Low Energy (BLE) communication system. In some cases, a plurality of the beacon devices 218 may be positioned in and around the merchant 202 physical location. Each of the beacon devices 218 may be configured to wirelessly communicate, via the Wi-Fi communications system, with the merchant network communication device 204. In operation, each of the beacon devices 218 is configured to create a communication area using the BLE communication system. In some examples, the various communications areas created using the BLE communication system of the beacon devices 218 may abut, overlap, or otherwise provide coverage for any area of interest within and around the merchant 202 physical location. In some embodiments, each of the beacon devices 218 may be configured to communicate with customer devices within their respective communications area (e.g., created using the BLE communication system) to collect information (including to detect a customer associated with the customer device), and then send that information to the merchant network communication device 204 (e.g., using the Wi-Fi communications system) and thus provide the data to the system provider device 108. In an embodiment, each of the beacon devices 218 may also communicate with a database at the merchant 202 physical location to retrieve real-time merchant and/or customer information. In various examples, a number of people (e.g., customers) detected at and/or around the merchant 202 physical location may be used by the system provider device 108 to further estimate a customer wait time.

In accordance with some embodiments, the number of people detected at and/or around the merchant 202 physical location may not be used as a primary factor for estimating customer wait time (e.g., in contrast to other factors discussed herein) at least because this factor is not necessarily an accurate indicator of customer wait time. For instance, returning to the coffee shop example, consider a situation where many people at the coffee shop are merely there to use a free Wi-Fi service offered by the coffee shop, while not actually purchasing something (or purchasing something very infrequently). In this case, simply relying on a number of people detected at and/or around a merchant physical location to estimate a customer wait time could be quite misleading. As another example, relying simply on a number of transactions to estimate a customer wait time may also be inaccurate. For instance, a single detected transaction (e.g., in a given time frame) could imply a short customer wait time. However, if that single transaction is for an order of a large number of drinks, food items, etc., then the customer wait time may in fact be comparatively longer. Thus, the various embodiments described herein for estimation of customer wait time may instead rely primarily on other factors such as payment volume (e.g., total and/or per unit time), rate of transactions (e.g., number of transactions per minute), usage or consumption rate of consumable goods or utilities (e.g., electricity, gas, water, sewage, internet, or other utilities), merchant staffing level, or other such factors.

Figure 4:
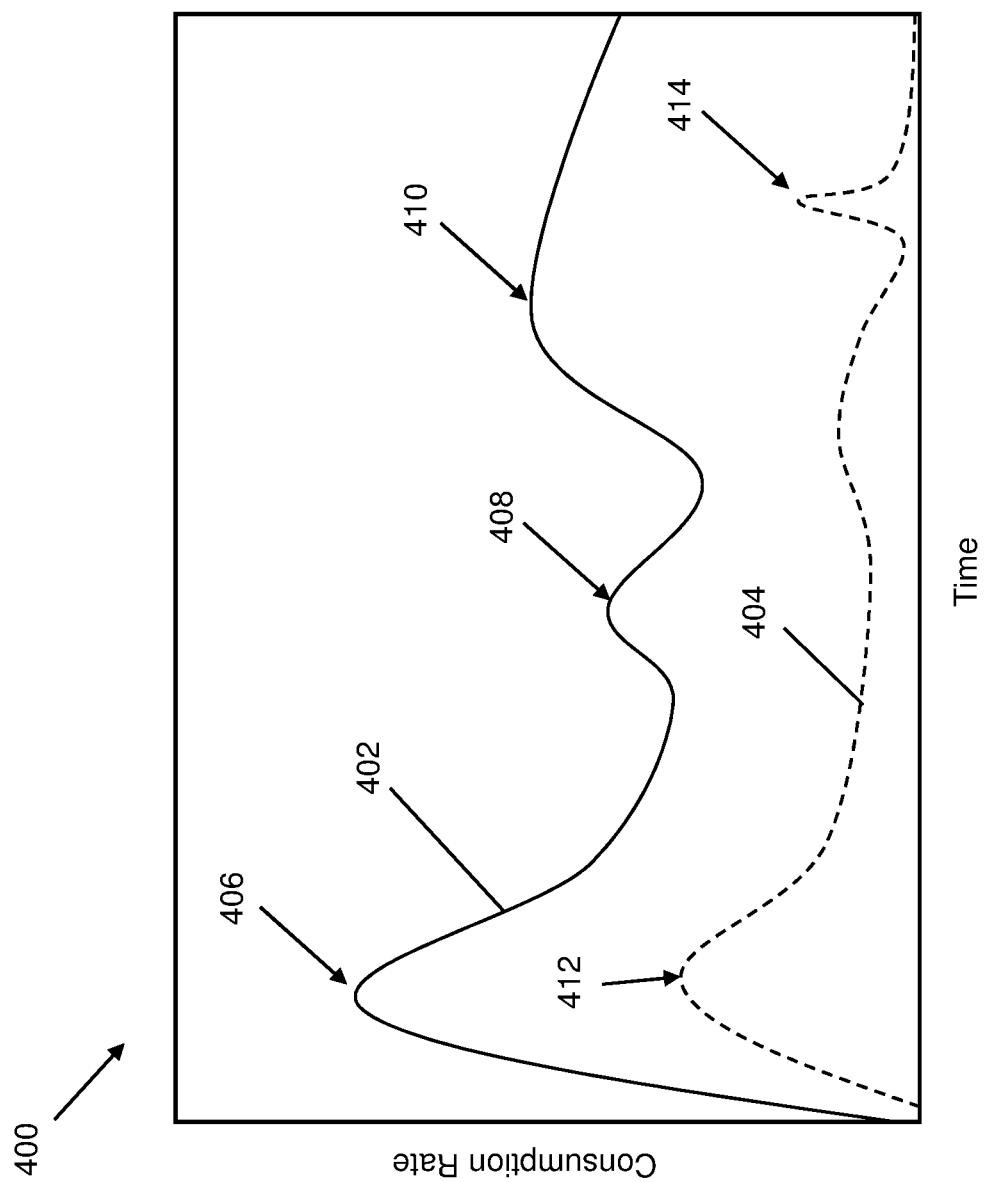
FIG. 4 illustrates an exemplary graph showing consumption rate as a function of time.

Referring now to FIG. 4, illustrated therein is an exemplary graph 400 showing 'Consumption Rate' as a function of 'Time'. It will be understood that the data shown in the graph 400 may be represented using any of a variety of different types of charts. In some embodiments, the graph 400 provides a first curve 402 showing a consumption rate of a first consumable good or utility, and a second curve 404 showing a consumption rate of a second consumable good or utility. In accordance with the examples discussed above, the 'Consumption Rate' represented by the first and second curves 402, 404 may refer to a rate of consumption of any of the consumable goods or utilities discussed above such as a rate of consumption of water (e.g., as determined by the smart water meter 208), a rate of consumption of energy such as electricity or natural gas (e.g., as determined by the smart energy meter 210), a rate of consumption of water, milk, or beans (e.g., as determined by the smart appliances 212), a rate of consumption of inventory items (e.g., as determined by the smart shelves 214), as well as a rate of consumption of any other consumable goods that may be used or otherwise consumed at a merchant physical location. For instance, referring again to the coffee shop example, a consumption rate of any of a variety of other items may also be monitored such as cups, lids, packaged foods and drinks, pastries, tea bags, syrups, sugar, napkins, toilet paper, hand soap, or any other of a variety of consumables. In some cases, such consumables may be monitored using RFID tags and RFID readers (e.g., similar to the smart shelves 214), weight sensors, optical sensors, temperature sensors, acoustic sensors, gas sensors, accelerometers, or other types of sensors that are coupled to, or are otherwise configured to sense consumption of a particular consumable. Furthermore, depending on the type of merchant, a variety of other sensor configurations, types, and uses may be implemented. For example, at a gas station, one or more sensors may be used to measure a consumption rate of gasoline. In the case of a car wash, a smart water meter may be used to monitor the consumption rate of water, while one or more other sensors may be used to monitor consumption rates of soap, wax, or other such consumable. While some examples of other types of merchants that may utilize the disclosed navigation system have been provided, those skilled in the art in possession of the present disclosure will recognize still other types of merchants operating any of a variety of merchant physical locations that may benefit from the disclosed navigation system, while remaining within the scope of the present disclosure Returning to the first and second curves 402, 404, periods of increased consumption of the first and second consumable goods or utilities, indicated generally by peaks 406, 408, 410, 412, 414, may indicate increased customer wait times during respective time periods when such peaks occur. Considering a coffee shop, if a customer searches for a particular coffee shop (e.g., using the navigation system and during a time period when one of the peaks 406, 408, 410, 412, 414 occurs), the system provider device 108 may use the consumption rate data to direct the customer to an alternative coffee shop (e.g., to reduce and/or minimize the total customer time). In some cases, if the customer searches for the particular coffee shop during a different time period (e.g., outside the time period during which the peaks 406, 408, 410, 412, 414 occur), the system provider device 108 may nevertheless direct the customer to an alternative coffee shop if, for example, directing the customer to the alternative coffee shop provides a better (e.g., shorter) total customer time (travel time+wait time). Further, in some examples, if a customer searches for the particular coffee shop (e.g., during the time period when one of the peaks 406, 408, 410, 412, 414 occurs), the system provider device 108 may still direct the customer to the particular coffee shop if, for example, directing the customer to the particular coffee shop provides a better (e.g., shorter) total customer time than directing the customer to an alternative coffee shop.

Figure 5:
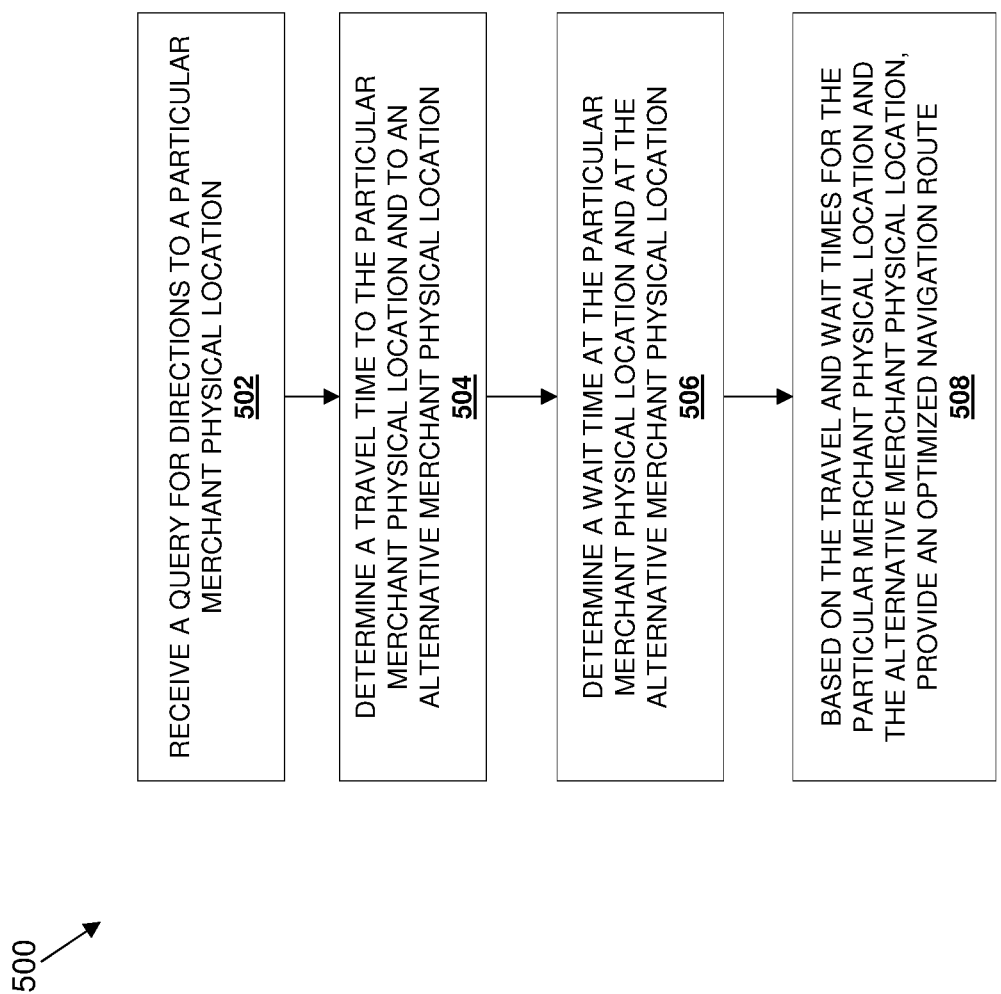
FIG. 5 is a flow chart illustrating an embodiment of a method for providing optimized navigation to a merchant physical location.
Figure 7:
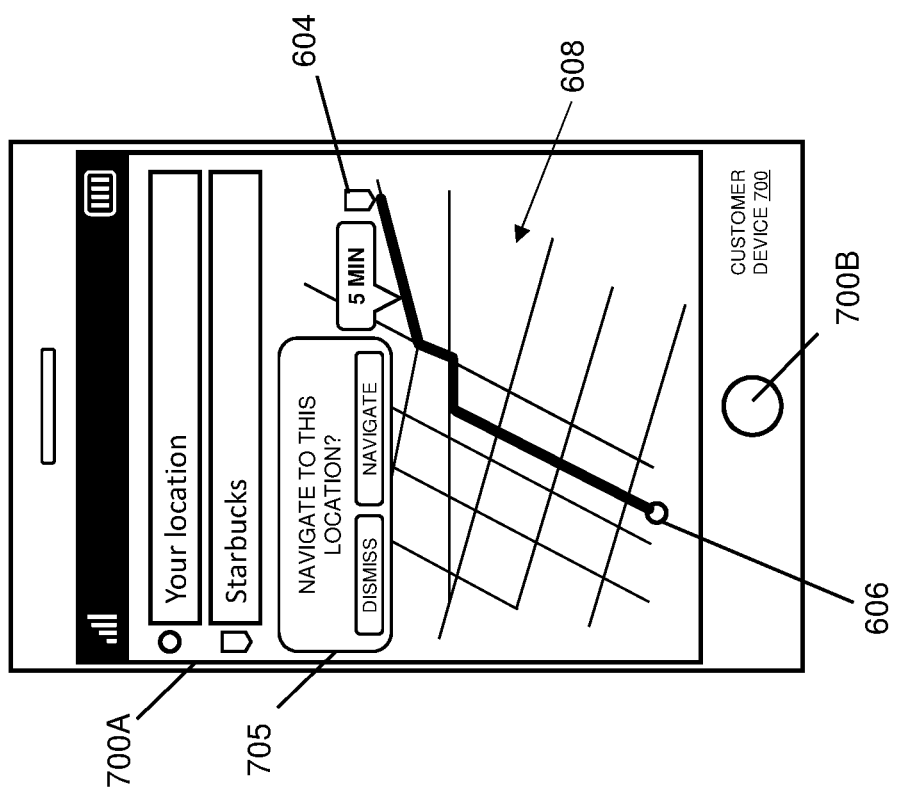
FIG. 7 is a front view illustrating an embodiment of a customer device displaying a confirmation message confirming a selection to navigate to a merchant physical location.
Figure 8:
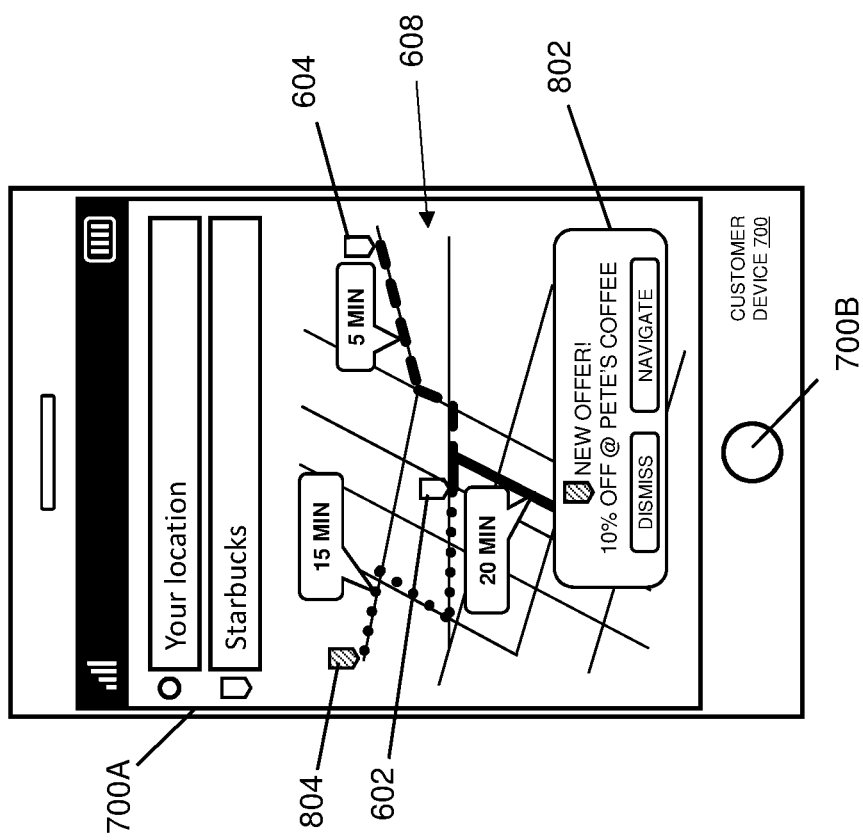
FIG. 8 is a front view illustrating an embodiment of a customer device displaying an offer message for a different merchant physical location.

Referring now to FIG. 5, an embodiment of a method 500 for providing optimized navigation to a merchant physical location is illustrated. One of skill in the art in possession of the present disclosure will recognize that the method 500 may be performed for a plurality of different users at a variety of physical locations, and for a plurality of different merchants at a variety of physical locations. Generally, the method 500 may be used to provide for more efficient routing of customers to merchant physical locations based on a total time spent traveling to (e.g., driving to), and waiting at, a merchant physical location. In the various embodiments described herein, any of a plurality of merchants operating the plurality of merchant physical locations may operate in a cooperative or competitive manner, may offer competing products and/or services, may offer complementary products and/or services, may bid against one another for potential customers, and/or may offer various incentives to potential customers. It will also be understood that additional steps may be performed before, during, and/or after the steps described below with reference to the method 500, and that the various steps described may be performed in a different order than that shown and described with reference to the method 500. Further, various aspects of the method 500 are illustrated and described below with reference to FIGS. 6, 7, and 8.

Figure 6:
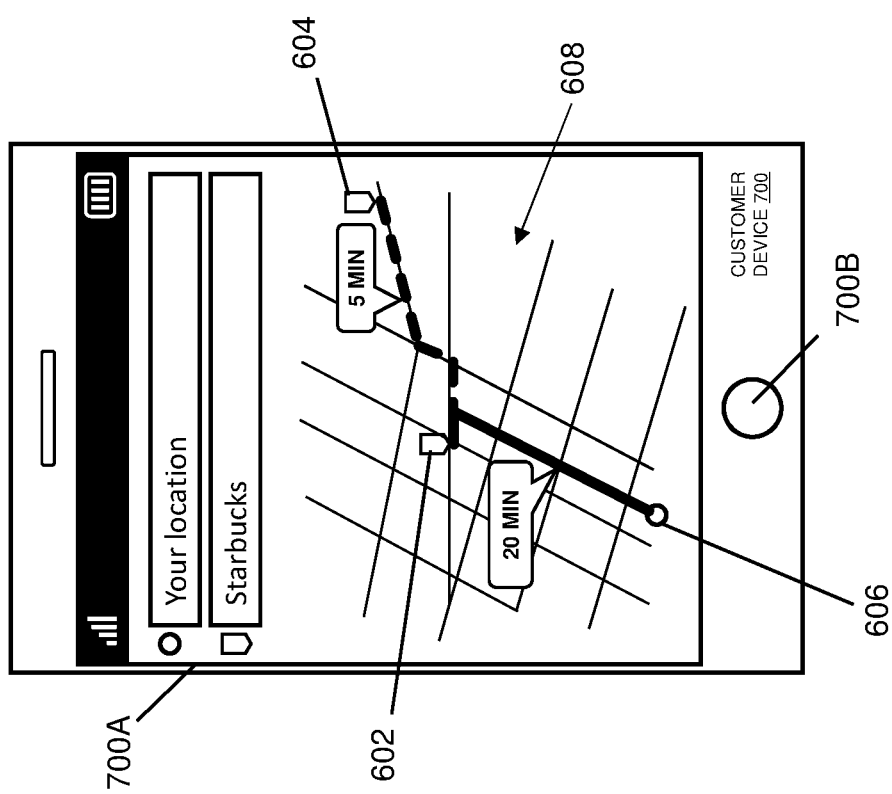
FIG. 6 is a front view illustrating an embodiment of a customer device displaying search results for a customer searching for a merchant physical location.

The method 500 begins at block 502 where a query for directions to a particular merchant physical location is received. In particular, with reference to FIGS. 6-8, a specific example of the method 500 is illustrated and described. Referring first to FIG. 6, illustrated therein is an example of a customer searching for a particular merchant physical location. In particular, FIG. 6 shows a customer device 700 including a display 700A and an input button 700B. While the customer device 700 is illustrated and described as a mobile phone, a variety of other customer devices are envisioned as falling within the scope of the present disclosure. For example, in some cases, the customer device 700 may include an in-vehicle infotainment (IVI) system (to which the customer's mobile phone may be connected). In one example, the customer device 700 may include a system provider application and/or a payment service provider application (e.g., a PayPal, Inc. application) which may be launched by the customer and that provides for the functionality of the customer device 700 discussed below. In some cases, the functionality discussed with reference to the method 500 may be implemented as an add-on functionality to another navigation application, for example, as an application programming interface (API). As shown in the illustrated example, the customer may search for the particular merchant physical location using a merchant name (e.g., Starbucks). Generally, the customer may perform such a search using a name of a particular merchant type (e.g., "restaurants", "bars", "coffee shops", "gas stations", "drugstores", etc.) or a merchant name, as in the present example. In various embodiments, the customer search may be sent from the customer device 700 and received at the system provider device 108.

The method 500 proceeds to block 504 where a travel time to the particular merchant physical location and to an alternative merchant physical location are determined. For example, referring to FIG. 6 and in an embodiment of block 504, the system provider device 108 may determine a travel time to a particular merchant physical location 602 and to an alternative merchant physical location 604. In some embodiments, at least the particular merchant physical location 602 may include the particular merchant physical location for which the customer searched. By way of example, the particular merchant physical location 602 and the alternative merchant physical location 604 may be operated by the same merchant. Alternatively, in some cases, the particular merchant physical location 602 and the alternative merchant physical location 604 may be operated by different merchants, which may be cooperative or competitive with one another. In various examples, the travel time to the particular merchant physical location 602 may be determined based on a distance between a customer's physical location 606 and the particular merchant physical location 602 (e.g., using GPS coordinates), as well as other factors such as traffic conditions, speed limits, weather conditions, or other factors. The travel time to the alternative merchant physical location 604 may similarly be determined based on a distance between the customer's physical location 606 and the alternative merchant physical location 604 (e.g., using GPS coordinates), as well as other factors such as traffic conditions, speed limits, weather conditions, or other factors.

The method 500 proceeds to block 506 where a customer wait time at the particular merchant physical location and at the alternative merchant physical location is determined. For example, in an embodiment of block 506, the system provider device 108 may determine a customer wait time at the particular merchant physical location 602 and at the alternative merchant physical location 604. The customer wait time may be determined based on one or more of the plurality of factors discussed above, for example, with reference to FIGS. 1-4. For instance, the system provider device 108 may monitor merchant sales activity (e.g., total payment volume, payment volume per unit time, rate of transactions, etc.), usage or consumption rate of any of a plurality of consumable goods or utilities (e.g., water consumption, energy consumption, consumption of consumable goods and/or inventory, etc.), merchant staffing levels, number of people detected at and/or around the particular merchant physical location 602 and the alternative merchant physical location 604, as well as any of a plurality of other factors that may be used to determine a customer wait time at each of the particular merchant physical location 602 and the alternative merchant physical location 604.

The method 500 proceeds to block 508, where based on a combination of the determined travel times (block 504) and the determined customer wait times (block 506), an optimized navigation route is provided. In general, the system provider device 108 may provide navigation to the merchant physical location that provides the shortest total customer time (travel time+wait time). In particular, with reference to FIG. 6, a first total customer time '20 MIN' is provided for the particular merchant physical location 602, and a second total customer time '5 MIN' is provided for the alternative merchant physical location 604. For avoidance of doubt, the times shown in FIG. 6 are not merely travel times to the merchant locations but are estimates provided by the system provider of the total customer time (travel time to the merchant location+customer wait time at the merchant location). Thus, in the present example, the system provider may automatically direct the customer to the alternative merchant physical location 604, as this merchant location provides a better (shorter) total customer time than the particular merchant physical location 602.

In various cases, the system provider device 108 may automatically direct the customer, as described above. In particular, in some embodiments, the user may configure one or more preferences (e.g., via the customer device 700) such that the system provider device 108 may automatically determine (e.g., based on the one or more preferences) to which merchant physical location the user should be directed. In some examples, the system provider device 108 may learn (e.g., based on user behaviors) and intelligently select the merchant physical location to which the user should be directed. Alternatively, in some cases, the system provider device 108 may provide navigation options for user selection. For instance, in some embodiments, the system provider may display a map 608 via the display 700A that includes navigation routes and total customer times for each of the particular merchant physical location 602 and the alternative merchant physical location 604. Based on the displayed options, a customer operating the customer device 700 may select whether to navigate to the particular merchant physical location 602 or the alternative merchant physical location 604 (e.g., by tapping on the particular merchant physical location 602 or the alternative merchant physical location 604 using a touchscreen interface of the display 700A). By way of example, consider that the customer selects the alternative merchant physical location 604. In some embodiments, and with reference to FIG. 7, the system provider may highlight the route to the selected alternative merchant physical location 604 and optionally provide a confirmation message 705. In the present example, the confirmation message 705 may serve to confirm whether the customer in fact would like to navigate to the alternative merchant physical location 604. In various embodiments, and via the confirmation message 705, the customer may select 'DISMISS' to cancel navigation or 'NAVIGATE' to confirm the selection and proceed navigating to the alternative merchant physical location 604.

As previously noted, various merchants may offer competing and/or complementary products and/or services, may bid against one another for potential customers, and/or may offer various incentives to potential customers. In one example, and with reference to FIG. 8, the system provider may provide an option to navigate to another merchant physical location 804, in addition to the merchant physical locations 602, 604. In the present example, the merchant physical location 804 may be operated by competing merchant (e.g., Pete's Coffee). As shown, the system provider may further provide a total customer time '15 MIN' for the merchant physical location 804. In some embodiments, and in conjunction with providing the option to navigate to the merchant physical location 804, the system provider may provide an offer message 802. In the present example, the offer message 802 may serve to provide information and/or offers associated with the merchant physical location 804, which are presented to the customer via the customer device 700 in an effort to entice the customer to navigate to the merchant physical location 804. In various examples, the offer message 802 may include a merchant name, a merchant rating, a merchant offer (e.g., 10% off), a total customer time (travel time+wait time), and/or other merchant information as known in the art. In various embodiments, and via the offer message 802, the customer may select 'DISMISS' to cancel navigation or 'NAVIGATE' to confirm the selection and proceed navigating to the merchant physical location 804. While a specific example of the method 500 for providing optimized navigation to a merchant physical location has been shown and described, one of skill in the art will recognize that other methods and techniques may be included in the method 500, while remaining within the scope of the present disclosure.

Thus, systems and methods have been described that provide for more efficient routing of customers to merchant physical locations based on a total time spent traveling to (e.g., driving to), and waiting at, a merchant physical location. In some embodiments, the customer navigation system described herein may direct the customer (e.g., using the navigation system) to a merchant physical location based on a combination of (i) distance and/or travel time to the merchant physical location and (ii) customer wait time at the merchant physical location. By way of example, the customer wait time may be based on a variety of factors such as payment volume (e.g., total and/or per unit time), rate of transactions (e.g., number of transactions per minute), as well as a usage or consumption rate of any of a plurality of consumable goods or utilities (e.g., electricity, gas, water, sewage, internet, or other utilities). In some cases, the customer wait time may also be based on other factors such as a staffing level at a merchant physical location, a number of cars parked at or near the merchant physical location, a number of people at the merchant physical location, traffic patterns near the merchant physical location, or various other factors. In some cases, embodiments of the customer navigation system described herein may also provide a mechanism by which a merchant operating a plurality of merchant physical locations, or a plurality of merchants operating a plurality of merchant physical locations, can maintain a steadier stream of customers. Further, in other embodiments, the suggested merchant location may be based on data beyond just the total time spent or total customer time. The data may include a location of a next destination for the user. For example, if a first merchant location is determined to have a longer total customer time, but is quite a bit closer to the next destination for the user (e.g., work, restaurant, office, etc.) than a second location determined to have a shorter total customer time, the first merchant location may be suggested. This may be the case where the total time spent traveling to the first merchant, shopping at the first merchant, and then traveling from the first merchant to the next destination is shorter than the time spent traveling to the second merchant, shopping at the second merchant, and traveling from the second merchant to the next destination even though the total time spent for the second merchant is shorter than for the first merchant.

Figure 9:
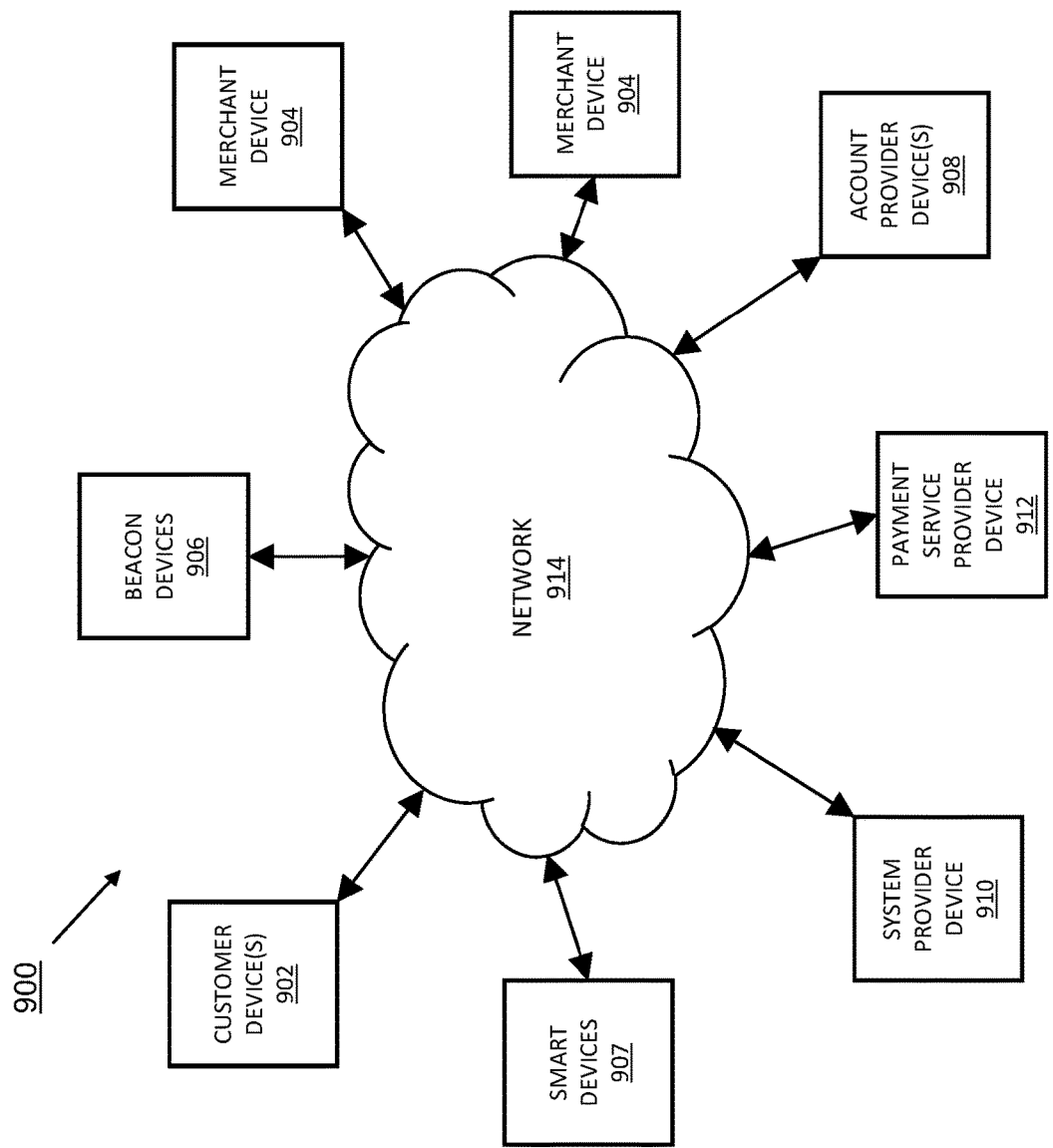
FIG. 9 is a schematic view illustrating an embodiment of a networked system.

Referring now to FIG. 9, an embodiment of a network-based system 900 for implementing one or more processes described herein is illustrated. As shown, the network-based system 900 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 9 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 900 illustrated in FIG. 9 includes a plurality of customer devices 902, a plurality of merchant devices 904, a plurality of beacon devices 906, a plurality of smart devices 907, a payment service provider device 912, account provider device(s) 908, and/or a system provider device 910 in communication over one or more networks 914. The customer devices 902 may be the customer devices discussed above and may be operated by the customers discussed above. The merchant devices 904 and beacon devices 906 may be the merchant devices and beacon devices discussed above and may be operated by the merchants discussed above. The smart devices 907 may be the smart devices discussed above and may be operated by the merchants discussed above. The payment service provider device 912 may be the payment service provider devices discussed above and may be operated by a payment service provider such as, for example, PayPal Inc. of San Jose, Calif. The system provider devices 910 may be the system provider devices discussed above and may be operated by the system providers discussed above. The account provider devices 908 may be operated by credit card account providers, bank account providers, savings account providers, and a variety of other account providers known in the art.

The customer devices 902, merchant devices 904, beacon devices 906, smart devices 907, payment service provider device 912, account provider devices 908, and/or system provider device 910 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 914.

The network 914 may be implemented as a single network or a combination of multiple networks. For example, in various embodiments, the network 914 may include the Internet and/or one or more intranets, landline networks, wireless networks, and/or other appropriate types of networks.

The customer devices 902 may be implemented using any appropriate combination of hardware and/or software configured for wired and/or wireless communication over network 914. For example, in one embodiment, the customer devices 902 may be implemented as a personal computer of a user in communication with the Internet. In other embodiments, the customer devices 902 may be a smart phone, wearable computing device, laptop computer, and/or other types of computing devices.

The customer devices 902 may include one or more browser applications which may be used, for example, to provide a convenient interface to permit the customer to browse information available over the network 914. For example, in one embodiment, the browser application may be implemented as a web browser configured to view information available over the Internet.

The customer devices 902 may also include one or more toolbar applications which may be used, for example, to provide user-side processing for performing desired tasks in response to operations selected by the customer. In one embodiment, the toolbar application may display a user interface in connection with the browser application.

The customer devices 902 may further include other applications as may be desired in particular embodiments to provide desired features to the customer devices 902. In particular, the other applications may include a payment application for payments assisted by a payment service provider through the payment service provider device 912. The other applications may also include security applications for implementing user-side security features, programmatic user applications for interfacing with appropriate application programming interfaces (APIs) over the network 914, or other types of applications. Email and/or text applications may also be included, which allow customer payer to send and receive emails and/or text messages through the network 914. The customer devices 902 includes one or more user and/or device identifiers which may be implemented, for example, as operating system registry entries, cookies associated with the browser application, identifiers associated with hardware of the customer devices 902, or other appropriate identifiers, such as a phone number. In one embodiment, the user identifier may be used by the payment service provider device 912 and/or account provider device 908 to associate the user with a particular account as further described herein.

The merchant devices 904 may be maintained, for example, by a conventional or on-line merchant, conventional or digital goods seller, individual seller, and/or application developer offering various products and/or services in exchange for payment to be received conventionally or over the network 914. In this regard, the merchant device 904 may include a database identifying available products and/or services (e.g., collectively referred to as items) which may be made available for viewing and purchase by the customer.

The merchant devices 904 also include a checkout application which may be configured to facilitate the purchase by the payer of items. The checkout application may be configured to accept payment information from the user through the customer devices 902, the account provider through the account provider device 908, and/or from the payment service provider through the payment service provider device 912 over the network 914.

Figure 10:
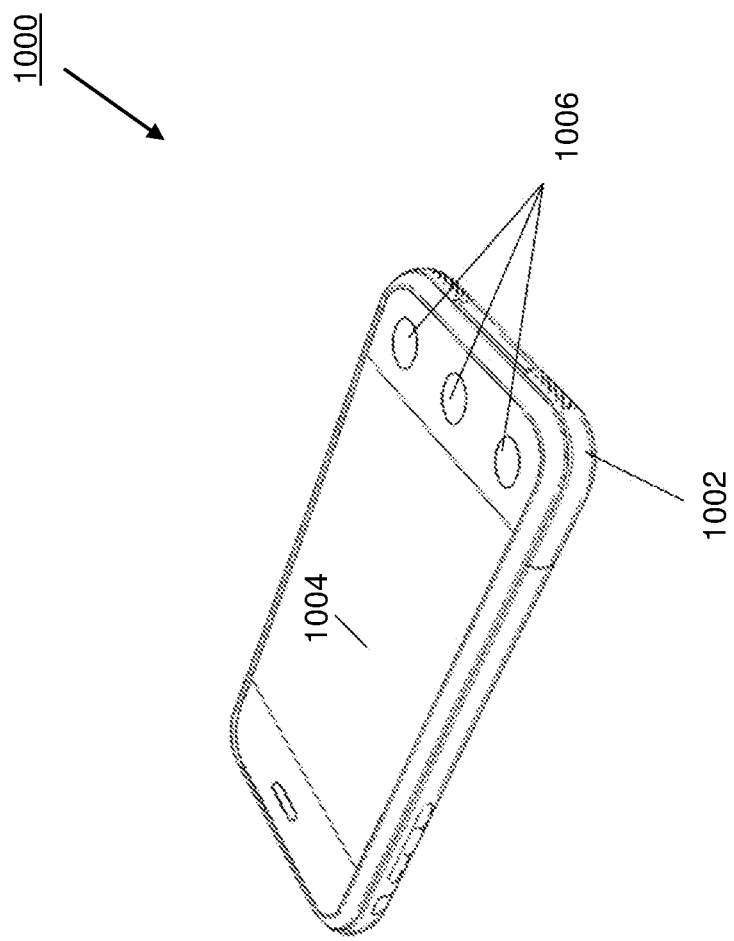
FIG. 10 is a perspective view illustrating an embodiment of a customer device.

Referring now to FIG. 10, an embodiment of a customer device 1000 is illustrated. The customer device 1000 may be the customer device 102, 700, or 902 discussed above. The customer device 1000 includes a chassis 1002 having a display 1004 and an input device including the display 1004 and a plurality of input buttons 1006. One of skill in the art will recognize that the customer device 1000 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 11:
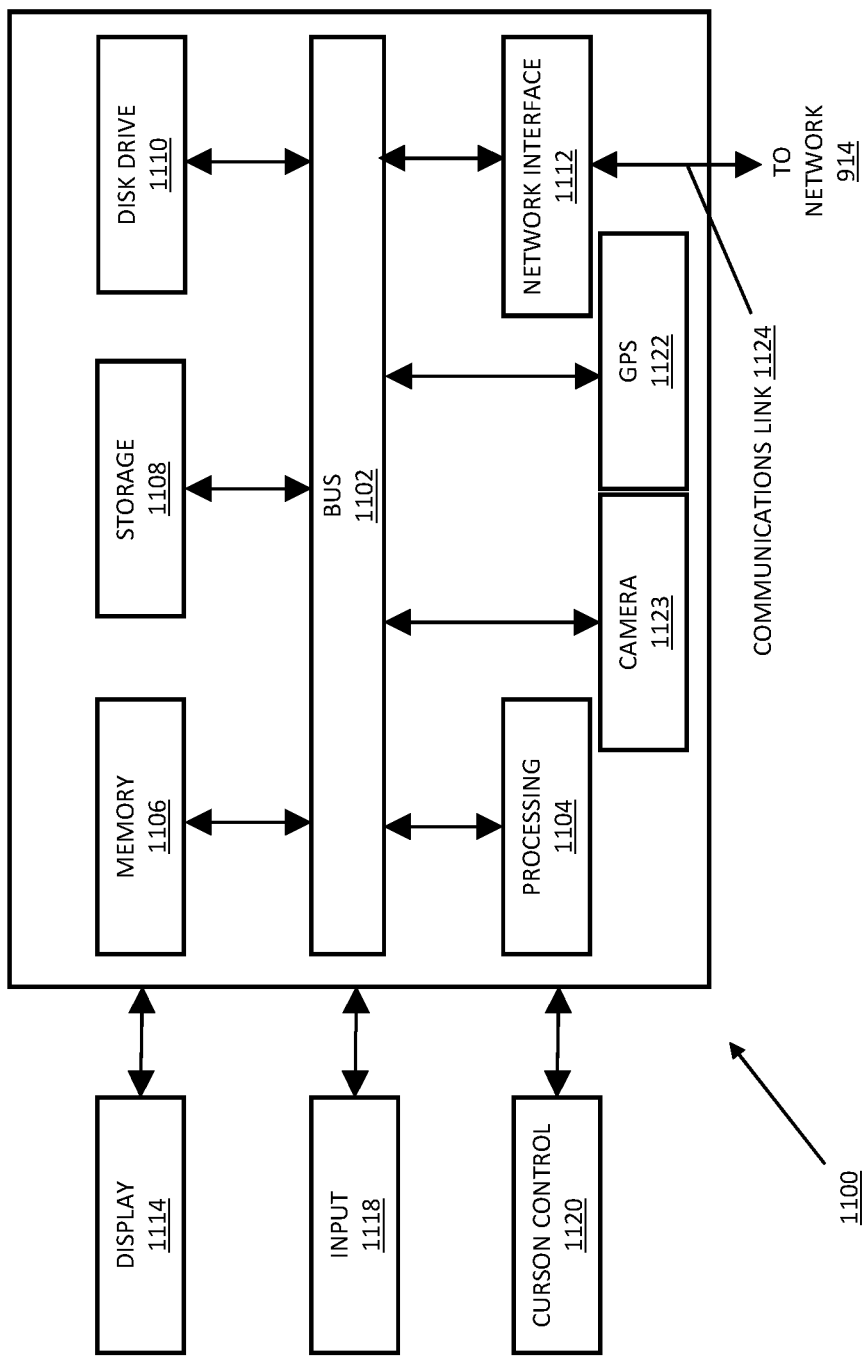
FIG. 11 is a schematic view illustrating an embodiment of a computer system.

Referring now to FIG. 11, an embodiment of a computer system 1100 suitable for implementing, for example, the customer devices 102, 700, or 902, merchant devices 204, 216, 904, beacon devices 218, or 906, smart devices 208, 210, 212, 214, 907, payment service provider device 912, account provider device(s) 908, and/or system provider devices 108 or 910, is illustrated. It should be appreciated that other devices utilized by customers, merchants, beacon devices, smart devices, merchant network communication devices, payment service providers, account provider device (s), and/or system providers in the system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), a location determination component 1122 (e.g., a Global Positioning System (GPS) device as illustrated, a cell tower triangulation device, and/or a variety of other location determination devices known in the art), and/or a camera component 1123. In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the customer devices 102, 700, or 902, merchant devices 204, 216, 904, beacon devices 218, or 906, smart devices 208, 210, 212, 214, 907, payment service provider device 912, account provider device(s) 908, and/or system provider devices 108 or 910. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 914 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Figure 12:
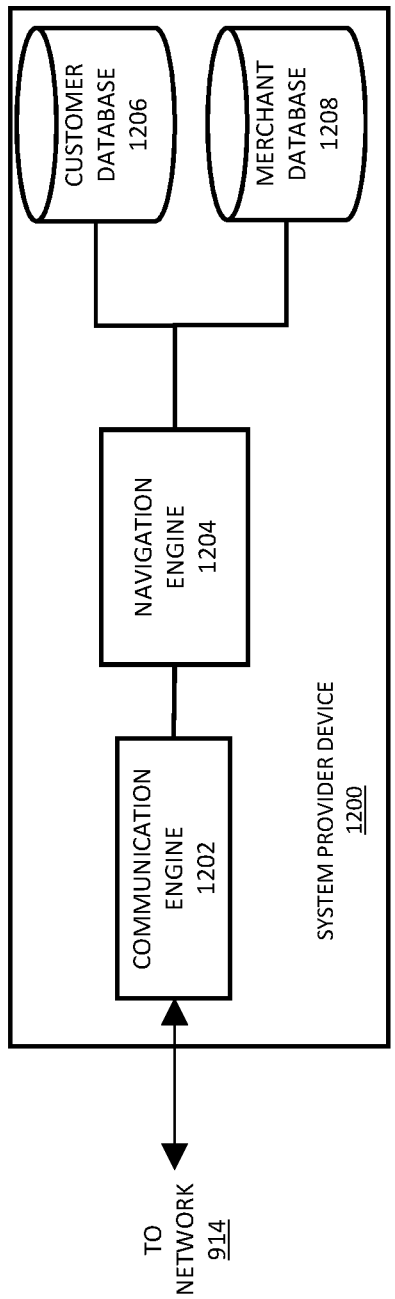
FIG. 12 is a schematic view illustrating an embodiment of a system provider device.

Referring now to FIG. 12, an embodiment of a system provider device 1200 is illustrated. In an embodiment, the device 1200 may be the system provider devices discussed above. The device 1200 includes a communication engine 1202 that is coupled to the network 914 and to a navigation engine 1204 that is coupled to a customer information database 1206 and a merchant information database 1208. The communication engine 1202 may be software or instructions stored on a computer-readable medium that allows the device 1200 to send and receive information over the network 914. The navigation engine 1204 may be software or instructions stored on a computer-readable medium that, when executed by a processor, is configured to receive and process a query for directions to a particular merchant physical location, determine a travel time to the particular merchant physical location and to an alternative merchant physical location, determine a customer wait time at the particular merchant physical location and at the alternative merchant physical location, provide an optimized navigation route based on a combination of the travel times and wait times to each of the particular merchant location and the alternative merchant location, as well as provide any of the other functionality that is discussed above. While the databases 1206 and 1208 have been illustrated as located in the device 1200, one of skill in the art will recognize that they may be connected to the navigation engine 1204 through the network 914 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory storing instructions; and
    one or more hardware processors configured to execute the instructions to cause the system to perform operations comprising:
        receiving a query for directions to a first merchant physical location;
        responsive to receiving the query,
            determining a first travel time to the first merchant physical location and a second travel time to a second merchant physical location,
            determining a first wait time at the first merchant physical location and a second wait time at the second merchant physical location, wherein determining the first wait time and the second wait time includes determining an amount of inventory consumption at each of the first merchant physical location and the second merchant physical location by detecting a change in quantity of one or more of a plurality of inventory items located at each of the first merchant physical location and the second merchant physical location based on signals received from radio frequency identification (RFID) readers located at each of the first merchant physical location and the second merchant physical location reading RFID tags attached to the one or more of the plurality of inventory items, and wherein different amounts of inventory consumption at each of the first merchant physical location and the second merchant physical location indicates that the first wait time is different than the second wait time;
        determining that a first total time using the first travel time and the first wait time is shorter than a second total time using the second travel time and the second wait time; and
        based on determining that the first total time is shorter than the second total time, providing navigation to the first merchant physical location.

2. The system of claim 1, wherein the providing navigation includes automatically providing navigation to the first merchant physical location based on a user preference.

3. The system of claim 1, wherein determining the first travel time and the second travel time is based on a distance between a customer device physical location and each of the first and second merchant physical locations, respectively.

4. The system of claim 1, wherein determining the first wait time and the second wait time is further based on a plurality of factors at each of the first and second merchant physical locations, respectively.

5. The system of claim 4, wherein the operations further comprise:
    determining baseline levels for each of the plurality of factors, wherein the first wait time and the second wait time are correlated to deviations from the baseline levels for each of the plurality of factors.

6. The system of claim 4, wherein the plurality of factors includes one or more of a total payment volume, a payment volume per unit time, a payment volume per device, a consumption rate of utilities, and a merchant staffing level.

7. The system of claim 6, wherein the consumption rate of the utilities includes a consumption rate of water and a consumption rate of energy.

8. The system of claim 4, wherein the operations further comprise:
    detecting an increase in one or more of the plurality of factors for at least one of the first and second merchant physical locations; and
    responsive to detecting the increase, determining a corresponding increase in at least one of the first wait time and the second wait time.

9. The system of claim 1, wherein the operations further comprise:
    providing an incentive for navigating to a third merchant physical location, wherein the third merchant physical location is operated by a different merchant than a merchant that operates at least one of the first merchant physical location and the second merchant physical location.

10. A method, comprising:
    receiving, by a system provider device through a network, a query for directions to a first merchant physical location;
    receiving, by the system provider device, first real-time energy consumption data and first real-time water consumption data from a first smart appliance located at the first merchant physical location and second real-time energy consumption data and second real-time water consumption data from a second smart appliance located at a second merchant physical location, wherein the first merchant physical location and the second merchant physical location are operated by a same merchant;
    responsive to receiving the query,
        determining, by the system provider device, a first travel time to the first merchant physical location and a second travel time to the second merchant physical location,
        determining, by the system provider device, a first wait time at the first merchant physical location and a second wait time at the second merchant physical location, wherein the first wait time and the second wait time are determined using the first real-time energy consumption data, the first real-time water consumption data, the second real-time energy consumption data, and the second real-time water consumption data;
        determining, by the system provider device, that a first total time using the first travel time and the first wait time is shorter than a second total time using the second travel time and the second wait time; and based on determining that the first total time is shorter than the second total time, providing, by the system provider device, navigation to the first merchant physical location.

11. The method of claim 10, wherein the first travel time and the first wait time are longer than the second travel time and the second wait time, respectively.

12. The method of claim 10, wherein:
determining the first wait time and the second wait time is based on a plurality of factors at each of the first and second merchant physical locations, respectively, wherein the plurality of factors includes one or more of a total payment volume, a payment volume per unit time, a payment volume per device, a number of transaction processing devices, a rate of transactions, a consumption rate of at least one of a plurality of consumable goods or utilities, and a merchant staffing level.

13. The method of claim 12, wherein the consumption rate of the at least one of the plurality of consumable goods or utilities includes a consumption rate of water and a consumption rate of consumable goods or inventory items.

14. The method of claim 12, further comprising:
determining, by the system provider device, baseline levels for each of the plurality of factors, wherein the first wait time and the second wait time are correlated to deviations from the baseline levels for each of the plurality of factors.

15. The method of claim 12, further comprising:
detecting, by the system provider device, an increase in one or more of the plurality of factors for at least one of the first and second merchant physical locations; and
responsive to detecting the increase, determining, by the system provider device, a corresponding increase in at least one of the first wait time and the second wait time.

16. The method of claim 10, wherein the first wait time and the second wait time are further determined based on a real-time merchant staffing level relative to a predetermined merchant staffing level at each of the first merchant physical location and the second merchant physical location, the real-time merchant staffing level determined based on tracking data received from a personnel tracking system that tracks employee time and attendance at respective ones of the first merchant physical location and the second merchant physical location.

17. A non-transitory machine-readable medium having stored thereon machine-readable instructions executable to cause a machine to perform operations comprising:
receiving a query for directions to a first merchant physical location;
receiving real-time energy consumption data and real-time resource consumption data from a plurality of smart appliances located at a plurality of merchant physical locations including the first merchant physical location and a second merchant physical location, wherein the first merchant physical location and the second merchant physical location are operated by a same merchant;
responsive to receiving the query,
determining a first travel time to the first merchant physical location and a second travel time to the second merchant physical location, determining a first wait time at the first merchant physical location and a second wait time at the second merchant physical location, wherein the first wait time and the second wait time are determined using the real-time energy consumption data and the real-time resource consumption data received from a first smart appliance of the plurality of smart appliances located at the first merchant physical location and from a second smart appliance of the plurality of smart appliances located at the second merchant physical location;
determining that a first total time using the first travel time and the first wait time is shorter than a second total time using the second travel time and the second wait time; and
based on determining that the first total time is shorter than the second total time, providing navigation to the first merchant physical location.

18. The non-transitory machine-readable medium of claim 17, wherein determining the first wait time and the second wait time is based on a plurality of factors at each of the first and second merchant physical locations, respectively, wherein the plurality of factors includes one or more of a total payment volume, a payment volume per unit time, a payment volume per device, a number of transaction processing devices, a rate of transactions, and a consumption rate of at least one of a plurality of consumable goods or utilities.

19. The non-transitory machine-readable medium of claim 18, wherein the operations further comprise:
determining baseline levels for each of the plurality of factors, wherein the first wait time and the second wait time are correlated to deviations from the baseline levels for each of the plurality of factors.

20. The non-transitory machine-readable medium of claim 18, wherein the operations further comprise:
detecting an increase in one or more of the plurality of factors; and
responsive to detecting the increase, determining a corresponding increase in at least one of the first wait time and the second wait time.

* * * * *